United States Patent
Maruoka et al.

(10) Patent No.: US 8,846,194 B2
(45) Date of Patent: Sep. 30, 2014

(54) ELECTROMAGNETIC WAVE-PERMEABLE BRILLIANT COATED RESIN PRODUCT AND MANUFACTURING METHOD THEREFOR

(75) Inventors: Yosuke Maruoka, Aichi-ken (JP); Hiroshi Watarai, Aichi-ken (JP); Takayasu Ido, Aichi-ken (JP); Koji Kuno, Aichi-ken (JP); Osamu Koyanaka, Saitama-ken (JP)

(73) Assignees: Toyoda Gosei Co., Ltd., Aichi-pref. (JP); Origin Electric Company, Limited, Tokyo (JP)

( * ) Notice: Subject to any disclaimer, the term of this patent is extended or adjusted under 35 U.S.C. 154(b) by 622 days.

(21) Appl. No.: 12/458,715

(22) Filed: Jul. 21, 2009

(65) Prior Publication Data

US 2010/0022696 A1    Jan. 28, 2010

(30) Foreign Application Priority Data

Jul. 25, 2008    (JP) ................... 2008-192444

(51) Int. Cl.
*H01B 3/04* (2006.01)
*C09D 5/36* (2006.01)

(52) U.S. Cl.
CPC ........................................ *C09D 5/36* (2013.01)
USPC ........................... 428/336; 428/324; 428/546

(58) Field of Classification Search
USPC .................... 428/324, 454, 546, 336
See application file for complete search history.

(56) References Cited

U.S. PATENT DOCUMENTS

| 6,596,069 | B2* | 7/2003 | Ido et al. ................... 106/403 |
| 2002/0013398 | A1 | 1/2002 | Ido et al. |
| 2004/0007696 | A1* | 1/2004 | Bemis et al. ................... 252/606 |
| 2004/0007969 | A1* | 1/2004 | Lu et al. ........................ 313/501 |
| 2006/0014858 | A1* | 1/2006 | Takano .......................... 523/204 |
| 2006/0225533 | A1* | 10/2006 | Minami .......................... 75/338 |
| 2008/0124559 | A1* | 5/2008 | Fujiwara et al. .............. 428/432 |

FOREIGN PATENT DOCUMENTS

| JP | A-2002-230505 | 8/2002 |
| JP | A-2004-244516 | 9/2004 |

OTHER PUBLICATIONS

Office Action mailed Apr. 24, 2012 issued in corresponding JP application No. 2008-192444.

* cited by examiner

*Primary Examiner* — Samir Shah
(74) *Attorney, Agent, or Firm* — Posz Law Group, PLC

(57) ABSTRACT

The present invention provides an electromagnetic wave-permeable brilliant coated resin product which has a brilliant coating film formed by applying a coating composition that includes a planar brightening material formed from aluminum, on a resin substrate. Within the brilliant coating film, the brightening material is oriented in a state such that a plane thereof is biased toward a direction that follows a surface of the brilliant coating film, and an average overlapping quantity (y), which is an average of a quantity of brightening material that crosses one orthogonal line that is orthogonal to the surface of the brilliant coating film, and an average inter-brightening material distance (x), which is an average of distances on the orthogonal line between adjacent brightening materials that cross said orthogonal line, satisfy the following two formulae:

$$y \geq 0.5 \qquad \text{(formula 1), and}$$

$$y \leq 0.3969x + 0.594 \qquad \text{(formula 2),}$$

where, the unit for x is μm.

13 Claims, 4 Drawing Sheets

F I G. 1
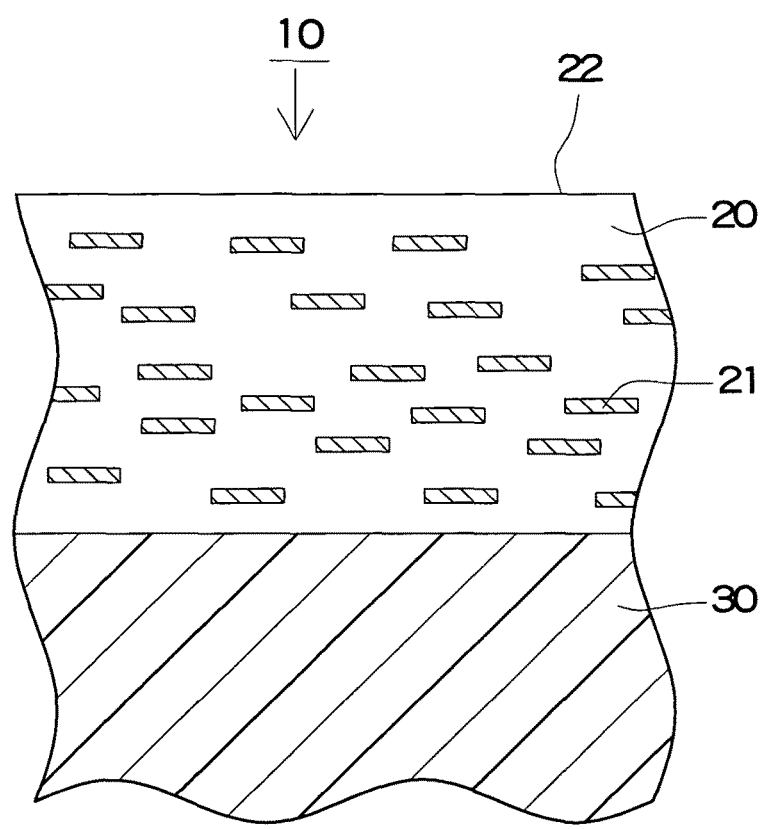

FIG. 3A
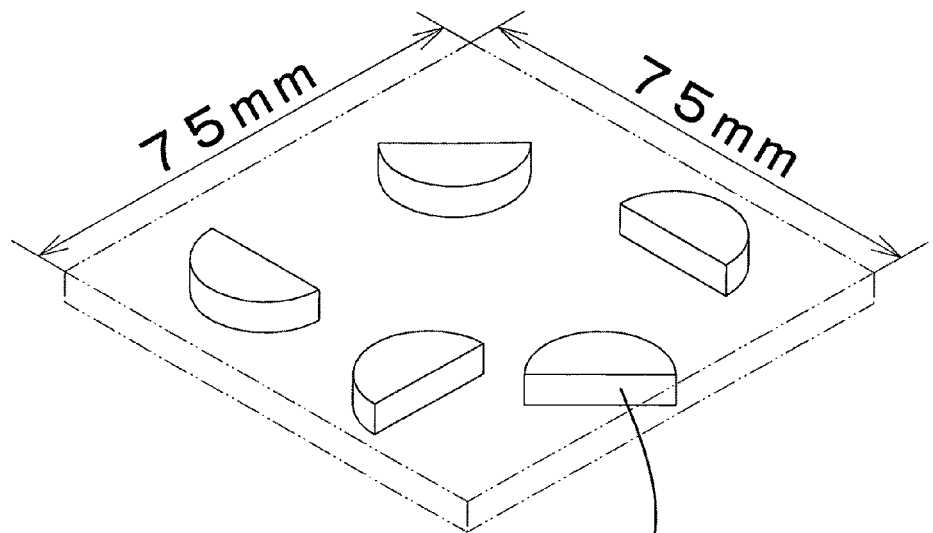
FIG. 3C
FIG. 3B
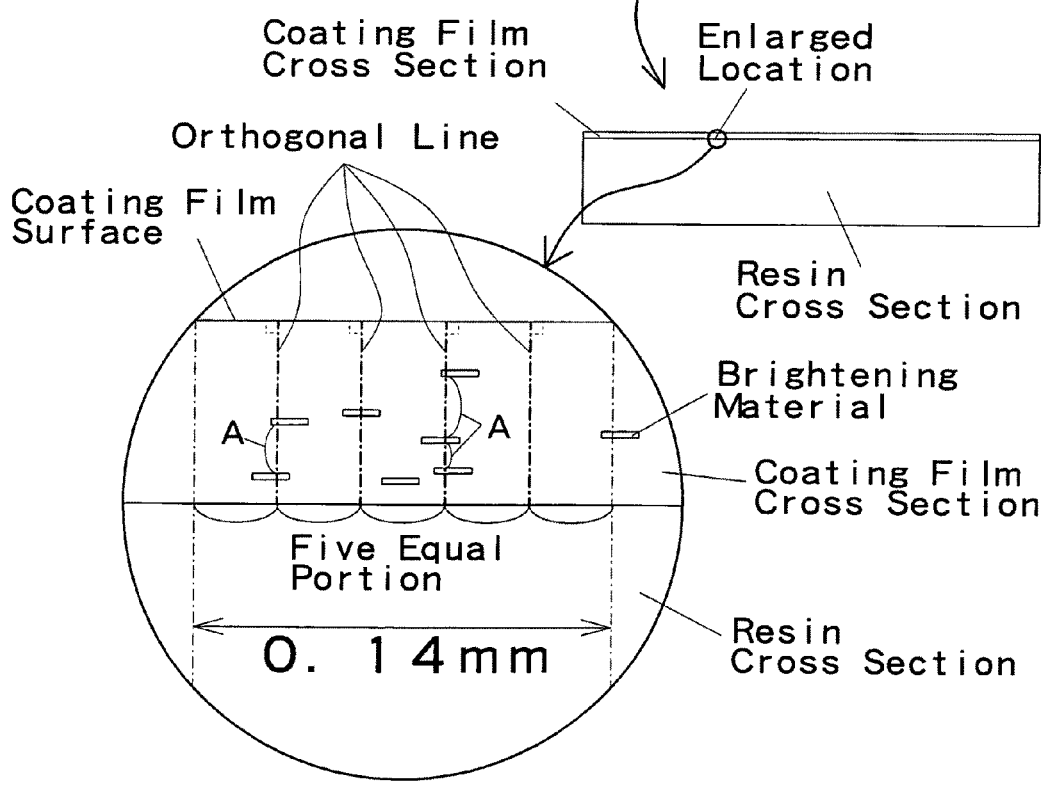

ELECTROMAGNETIC WAVE-PERMEABLE BRILLIANT COATED RESIN PRODUCT AND MANUFACTURING METHOD THEREFOR

TECHNICAL FIELD

The present invention relates to an electromagnetic wave-permeable brilliant coated resin product that includes a brilliant coating on a resin substrate, and a manufacturing method for such an electromagnetic wave-permeable brilliant coated resin product.

BACKGROUND ART

Automotive paint today often uses a coating composition that includes brightening material (such as mica or aluminum flakes) to reflect changes in buyer's tastes (the popularity of brilliant paint colors). Consequently, exterior automotive resin products such as bumpers which constitute the automobile are increasingly coated with a coating composition that contains brightening material in order to maintain an outer appearance that harmonizes with other regions of the automobile.

Meanwhile, for improving automobile safety, radar devices that measure distances and warn the driver when the automobile comes close to a nearby object may be provided at various parts of the automobile, for example, behind the radiator grille, the back panel, and the like. Such radar devices emit electromagnetic waves to objects to measure an intervening distance. However, if something (e.g. metal or the like) between the radar device and the object blocks the electromagnetic waves, the radar device can no longer perform its function. Therefore, exterior automotive resin products such as the radiator grille, which are positioned on the front surfaces of radar devices (parts that cover the radar devices), must be permeable to electromagnetic waves.

Given such requirements, an electromagnetic wave-permeable brilliant coated product as described in Patent Literature 1 has a brilliant urethane coated film that includes a mica as brightening material.

However, due to the fact that aluminum is conductive, it is considered difficult to obtain an electromagnetic wave-permeable brilliant coated resin product that has a brilliant coating film which includes aluminum flakes as brightening material.

CITATION LIST

Patent Literature

Patent Literature 1: Japanese Patent Application Publication No. JP-A-2004-244516

SUMMARY OF INVENTION

Technical Problem

This time it has been found that increasing the distance between aluminum flakes improves electromagnetic wave permeability (lessens electromagnetic wave attenuation).

Hence, the present invention provides an electromagnetic wave-permeable brilliant coated resin product that has a coating film with luster by including an aluminum brightening material and also has electromagnetic wave permeability, and a manufacturing method for such an electromagnetic wave-permeable brilliant coated resin product.

Solution to Problem (A) Electromagnetic Wave-Permeable Brilliant Coated Resin Product An electromagnetic wave-permeable brilliant coated resin product according to the present invention has a brilliant coating film that is formed by applying a coating composition that includes a planar brightening material formed from aluminum, on a resin substrate directly or on another coating film provided on the substrate, wherein within the brilliant coating film, the brightening material is oriented in a state such that a plane thereof is biased toward a direction that follows a surface of the brilliant coating film, and an average overlapping quantity (y), which is an average of a quantity of brightening material that crosses one orthogonal line that is orthogonal to the surface of the brilliant coating film, and an average inter-brightening material distance (x), which is an average of distances on the orthogonal line between adjacent brightening materials that cross the orthogonal line, satisfy the following two formulae:

$$y \geq 0.5 \quad \text{(formula 1), and}$$

$$y \leq 0.3969x + 0.594 \quad \text{(formula 2),}$$

where, the unit for x is μm.

(B) Manufacturing Method for Electromagnetic Wave-Permeable Brilliant Coated Resin Product A manufacturing method for an electromagnetic wave-permeable brilliant coated resin product according to the present invention is a manufacturing method comprising:

forming a brilliant coating film by applying a coating composition that includes a planar brightening material formed from aluminum, on a resin substrate directly or on another coating film provided on the substrate, wherein a product of a value indicating a mass % content of the brightening material within the brilliant coating film and a value indicating a thickness of the brilliant coating film in units of μm is 200 or less, and the thickness of the brilliant coating film formed by one application of the coating composition is 10 μm or less.

Another manufacturing method for an electromagnetic wave-permeable brilliant coated resin product according to the present invention is a manufacturing method comprising:

forming a brilliant coating film by applying a coating composition that includes a planar brightening material formed from aluminum, on a resin substrate directly or on another coating film provided on the substrate, wherein a product of a value indicating a mass % content of the brightening material within the brilliant coating film and a value indicating a thickness of the brilliant coating film in units of μm is 100 or less, and the coating composition includes a planar non-conductive pigment.

Forms of the elements in the present invention are exemplified below.

1. Brightening Material

Examples of the brightening material include but are not particularly limited to ground aluminum (aluminum flakes) that is formed from grinding aluminum foil or the like, and deposited aluminum that is formed from grinding an aluminum film formed by deposition or the like. Deposited aluminum with good luster due to a highly smooth plane is preferable.

In addition, a transparent non-conductive substance preferably covers an outer side of the aluminum that is ground.

The shape of the plane of the brightening material is not particularly limited and may be exemplified by circular and elliptical shapes, as well as polygonal shapes that include triangular, square, and rectangular shapes. The thickness of the brightening material is also not particularly limited, but is preferably 2 μm or less, and more preferably 1 μm or less. Moreover, the size of the brightening material is not particularly limited, but a length between end portions thereof is preferably 150 μm or less. The average particle size of the brightening material is also not particularly limited, but is preferably 60 μm or less, more preferably 30 μm or less, and even more preferably 15 μm or less.

Examples of the aluminum obviously include aluminum by itself and also include aluminum alloys.

Examples of the transparent non-conductive substance covering the outer side of the aluminum include but are not particularly limited to resins such as acrylic resin and polycarbonate (PC) resin, as well as glass.

The state in which the plane of the brightening material is oriented toward a direction that follows the surface of the brilliant coating film (an anisotropic state) is not a state in which the plane of the brightening material is oriented in a random direction (a so-called isotropic state), but rather a state as shown in the photo of FIG. 2 where most of the (white, slender) brightening material follows the surface of the coating film (around the center in the vertical direction).

2. Brilliant Coating Film

The thickness of the brilliant coating film is not particularly limited, but is preferably 10 to 40 μm. If the thickness is less than 10 μm, it becomes difficult to secure sufficient adhesiveness and durability. If the thickness is more than 40 μm, it becomes difficult to secure a good finished outer appearance and workability due to dripping and build-up during coating, as well as crucking and the like during drying.

However, if the thickness of the brilliant coating film formed by one application of the coating composition exceeds 10 μm, the brightening materials settle within the coating film before the coating film hardens and a sufficient inter-brightening material distance may become impossible to secure as a result. Therefore, the thickness of the brilliant coating film formed by one application and baking of the coating composition is preferably 10 μm or less.

Further, because a greater average inter-brightening material distance can be achieved, coating (including baking) is preferably performed multiple times.

The brightening material content within the brilliant coating film is not particularly limited, but is preferably 2.5 to 10.0 mass % in the case of ground aluminum. If the brightening material content is less than 2.5 mass %, it becomes difficult to obtain a coating film with good luster, and if the brightening material content is more than 10.0 mass %, the space between brightening materials decreases and it becomes difficult to obtain a coating film with good electromagnetic wave permeability. Meanwhile, 0.5 to 2.0 mass % is preferable in the case of deposited aluminum. This is because deposited aluminum is thinner than ground aluminum and has a large specific surface area.

A product of a value indicating a mass % (percent by mass unit) content of brightening material within the brilliant coating film and a value indicating a thickness of the brilliant coating film in units of μm is preferably 100 or less.

Examples of the coating composition include but are not particularly limited to an acrylic-based coating composition, a urethane-based coating composition, an epoxy-based coating composition, and a polyester-based coating composition. In addition, a planar non-conductive pigment is preferably included because of the resulting increased average inter-brightening material distance and improved luster of the coating film.

Examples of the coating method include but are not particularly limited to air spray coating, airless spray coating, dip coating, shower coating, and coating with a roll coater.

3. Planar Non-Conductive Pigment

Examples of the planar non-conductive pigment include but are not particularly limited to glass flakes formed by grinding glass into flakes, and pearl mica in which a film of a metal oxide such as titanium is formed on the mica surface.

The content within the brilliant coating film is not particularly limited, but is preferably 1 to 20 mass %.

4. Resin Substrate

Examples of the resin that is used for the resin substrate include but are not particularly limited to thermoplastic resins such as polycarbonate (PC), acrylonitrile-butadiene-styrene (ABS) copolymer, acrylonitrile-ethylene-styrene (AES) copolymer, and polypropylene (PP). Also, the resin substrate and the brilliant coating film may be provided in direct contact, or another coating film or the like such as a primer for improving the adhesiveness of the brilliant coating film with respect to the resin substrate may be provided between the resin substrate and the brilliant coating film.

5. orthogonal Line

The orthogonal line that is orthogonal to the surface of the coating film is not particularly limited. For example, at part of arbitrary cross section of the coating film that is cut in a direction orthogonal to the surface of the coating film, a line may divide the coating film cross section at said part into any integral multiple of two or more equal portions and may be orthogonal to the surface of the coating film.

6. Average Overlapping Quantity (y)

If the average overlapping quantity (y) is less than 0.5 (y<0.5), it becomes difficult to obtain a coating film with good luster. However, if the average overlapping quantity (y) is more than $0.3969x+0.594$ (y>$0.3969x+0.594$), it becomes difficult to obtain a coating film with good electromagnetic wave permeability. Therefore, preferably y≥0.9, and y≤$0.3969x+0.594$.

7. Average Inter-Brightening Material Distance (x)

The average inter-brightening material distance (x) is not particularly limited but is preferably 3 μm or more, and more preferably 3.5 μm or more.

8. Electromagnetic Wave-Permeable Brilliant Coated Resin Product

Applications for the electromagnetic wave-permeable brilliant coated resin product include but are not particularly limited to covers for millimeter wave radar installations and casings for communication devices, and any other application where electromagnetic wave permeability and a brilliant coating film are desired.

Advantageous Effects of Invention

According to the present invention, an electromagnetic wave-permeable brilliant coated resin product that has a coating film with luster by including an aluminum brightening material and also has electromagnetic wave permeability, and a manufacturing method for such an electromagnetic wave-permeable brilliant coated resin product can be provided.

BRIEF DESCRIPTION OF DRAWINGS

FIG. 1 is a schematic diagram that shows the details of a cross section near a surface of an electromagnetic wave-permeable brilliant coated resin product according to an embodiment of the present invention;

FIGS. 3A, 3B, and 3C are drawings that explain a method for measuring an overlapping quantity and an inter-brightening material distance.

DESCRIPTION OF EMBODIMENTS

An electromagnetic wave-permeable brilliant coated resin product has a brilliant coating film that is formed by applying a coating composition that includes a planar brightening material formed from aluminum, on a resin substrate directly or on another coating film provided on the substrate, wherein within the brilliant coating film, the brightening material is oriented in a state such that a plane thereof is biased toward a direction that follows a surface of the brilliant coating film, and an average overlapping quantity (y), which is an average of the quantity of brightening material that crosses one orthogonal line that is orthogonal to the surface of the brilliant coating film, and an average inter-brightening material distance (x), which is an average of the distances on the orthogonal line between adjacent brightening materials that cross said orthogonal line, satisfy the following three formulae:

$$y \geq 0.9 \quad \text{(formula 1)},$$

$$y \leq 0.3969x + 0.594 \quad \text{(formula 2), and}$$

$$x \geq 3 \quad \text{(formula 3)},$$

where, the unit for x is μm.

EXAMPLES

Figure 2:
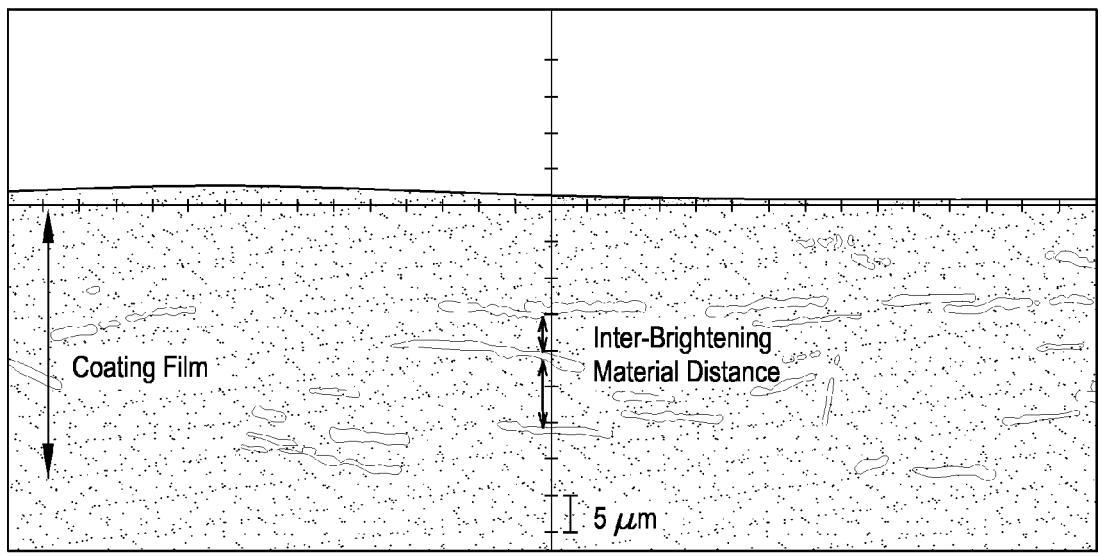
FIG. 2 is a microscope photo of the detailed cross section.

As illustrated in FIGS. 1 and 2, an electromagnetic wave-permeable brilliant coated resin product 10 has a brilliant coating film 20 that is formed by applying a coating composition that includes a planar brightening material 21 formed from aluminum on a polycarbonate (PC) substrate 30.

A plane of the brightening material 21 within the coating film 20 is oriented in (generally parallel to) a direction that follows a surface 22 of the brilliant coating film 20.

Examples and comparative examples will be used below to explain the present invention in greater detail.

Figure 4:
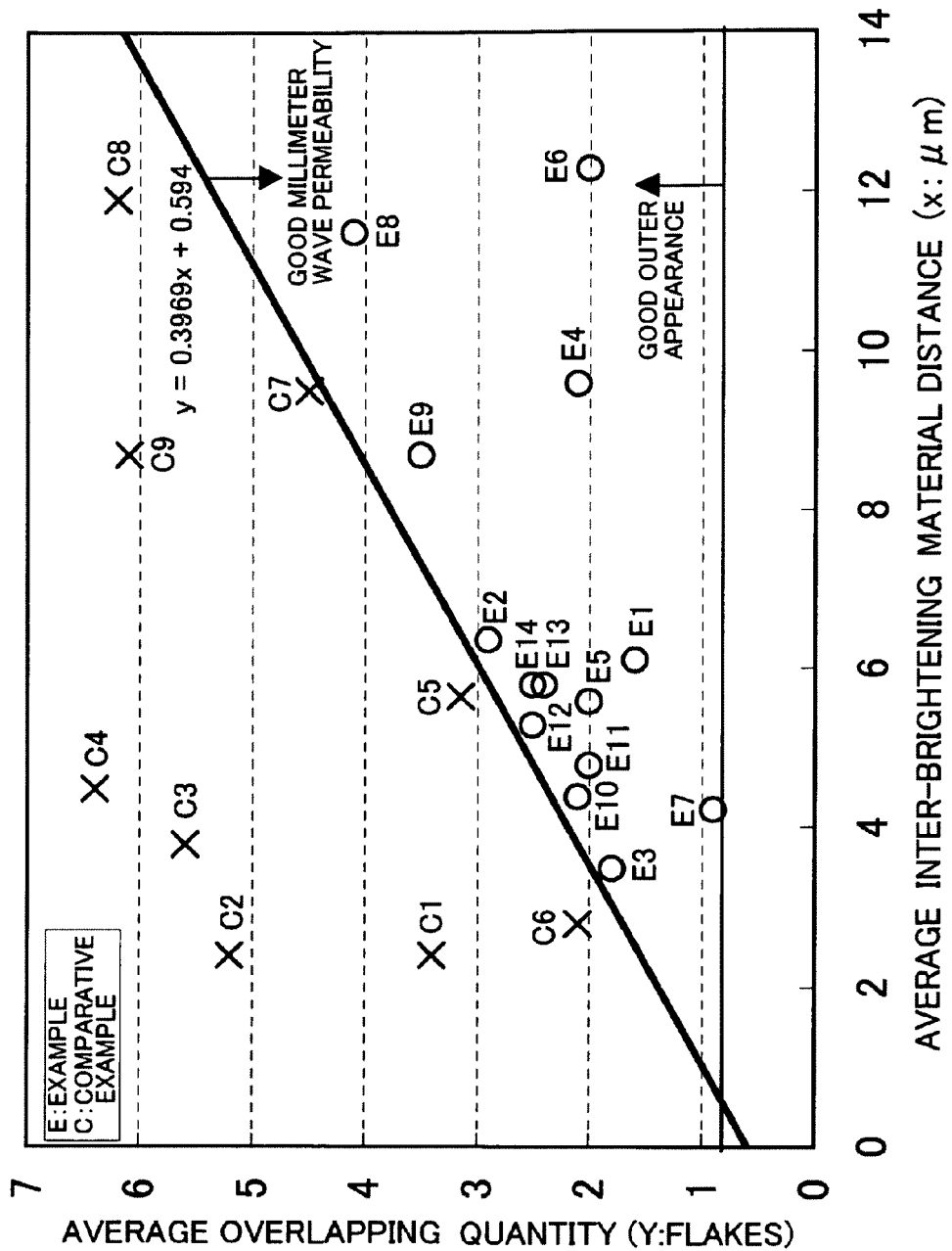
FIG. 4 is a graph that shows the relationship between an average inter-brightening material distance and an average overlapping quantity.

Table 1 shows measurements for the average overlapping quantity (y), average inter-brightening material distance (x), luster (IV), and electromagnetic wave (millimeter wave) permeability (millimeter wave transmission attenuation amount) regarding examples (9 types) and comparative examples (9 types) that have a brilliant coating film on a polycarbonate substrate, with the content of ground aluminum within the coating film component, thickness, and number of coatings (number of coating and baking cycles) varied. Also, a graph of the relationship between the average inter-brightening material distance and the average overlapping quantity for the examples and the comparative examples is shown in FIG. 4.

TABLE 1

| Sample | Brightening material content (mass %) | Brightening material Thickness (μm) | Brightening material content x Thickness | Number of Coatings (times) | Luster IV | Millimeter wave permeability Attenuation Amount (dB) | Evaluation | Average overlapping quantity (y: flakes) | Average inter-brightening materials distance (x: μm) |
|---|---|---|---|---|---|---|---|---|---|
| Example 1 | 5 | 17 | 85 | 2 | 149.7 | 0.727 | pass | 1.6 | 6.12 |
| Example 2 | 5 | 30 | 150 | 3 | 190.5 | 0.991 | pass | 2.9 | 6.37 |
| Example 3 | 10 | 10 | 100 | 1 | 155.6 | 0.925 | pass | 1.8 | 3.5 |
| Example 4 | 3.3 | 30 | 99 | 3 | 184.3 | 0.889 | pass | 2.1 | 9.6 |
| Example 5 | 5 | 20 | 100 | 2 | 172.5 | 0.874 | pass | 2 | 5.6 |
| Example 6 | 2.5 | 40 | 100 | 4 | 178.6 | 0.826 | pass | 2 | 12.3 |
| Example 7 | 5 | 10 | 50 | 1 | 142.5 | 0.956 | pass | 0.9 | 4.24 |
| Example 8 | 2.5 | 75 | 187.5 | 8 | 200.3 | 0.981 | pass | 4.1 | 11.5 |
| Example 9 | 3.3 | 60 | 198 | 6 | 199.4 | 0.952 | pass | 3.5 | 8.7 |
| Comparative Example 1 | 10 | 20 | 200 | 1 | 199.3 | 1.841 | fail | 3.4 | 2.4 |
| Comparative Example 2 | 10 | 30 | 300 | 1 | 222.3 | 2.207 | fail | 5.2 | 2.4 |
| Comparative Example 3 | 15 | 20 | 300 | 2 | 234.4 | 13.06 | fail | 5.6 | 3.8 |
| Comparative Example 4 | 15 | 30 | 450 | 3 | 240.7 | 15.42 | fail | 6.4 | 4.5 |
| Comparative Example 5 | 5 | 29 | 145 | 1 | 196.8 | 1.186 | fail | 3.15 | 5.65 |
| Comparative Example 6 | 5 | 20 | 100 | 1 | 168.3 | 1.064 | fail | 2.1 | 2.8 |
| Comparative Example 7 | 2.5 | 80 | 200 | 2 | 210.2 | 1.106 | fail | 4.5 | 9.5 |
| Comparative Example 8 | 2.5 | 105 | 262.5 | 10 | 239.7 | 1.926 | fail | 6.2 | 11.9 |
| Comparative Example 9 | 3.3 | 90 | 297 | 9 | 238.7 | 1.283 | fail | 6.1 | 8.7 |

Elements of the samples used for the present measurements are listed below.

Polycarbonate substrate: plate-shaped (thickness: 5 mm).
Coating composition: acrylic urethane paint.
Ground aluminum: planar-shaped (flakes, thickness: 1 μm, average particle size: 15 μm).
Coating method: samples were spray coated, and then baked after each coating. For samples subjected to multiple coatings, the coating/baking process was thus repeated multiple times. The thickness formed by coating and baking once was kept to 10 μm or less especially for the examples.

(1) Millimeter Wave Permeability

For millimeter wave permeability, based on the millimeter wave transmission attenuation amount calculated as shown below, a sample whose value is 1 dB or less is evaluated as passing and a sample whose value exceeds 1 dB is evaluated as failing.

The millimeter wave transmission attenuation amount was measured using an electromagnetic wave absorption measuring apparatus (free-space method, property of Japan Fine Ceramics Center).

Specifically, the samples were subjected to W-band (76.575 GHz) electromagnetic waves at an incident angle of 0 degrees from an emitter at room temperature. The sample was sandwiched between the emitter and a receiver, which faced the emitter. The receiver received electromagnetic waves that passed through the sample, whereby the millimeter wave transmission attenuation amount was measured. The millimeter wave transmission attenuation amount of the substrate itself was then subtracted from the measured millimeter wave transmission attenuation amount to find the millimeter wave transmission attenuation amount of the coating film itself.

(2) Luster

The intensity value (IV) was measured on a stack of 10 pieces of photocopying paper using a metallic appearance measuring apparatus (Alcope LMR-200, Kansai Paint Co., Ltd.). A greater IV indicates a higher luster.

(3) Average Overlapping Quantity (y) Measurement

As shown in FIGS. 3A, 3B, and 3C, from a 75 mm by 75 mm area within the sample, five arbitrary coating film cross sections which were cut in a direction that is orthogonal to the coating film surface (and to the surface of the resin substrate) (FIG. 3A) were prepared. Arbitrary locations on the respective coating film cross sections (FIG. 3B) were enlarged by a microscope and imaged. Based on such images, four orthogonal lines that are orthogonal to the coating film surface were drawn such that a coating film cross section whose width (length in a direction parallel to the coating film surface) is in the range of 0.14 mm was divided into five equal portions (FIG. 3C). The number of flakes of brightening material that cross the respective orthogonal lines were then counted. The average overlapping quantity was subsequently found by dividing the total number of flakes per orthogonal line by 20, which is the total number of orthogonal lines drawn on the coating film cross sections (4 lines×5 cross sections).

(4) Average Inter-Brightening Material Distance (x) Measurement

As shown in FIGS. 3A, 3B, and 3C, among the brightening materials that cross the 20 orthogonal lines drawn by above measurement of the average overlapping quantity, a distance A was measured on an orthogonal line between two adjacent brightening materials that cross this same orthogonal line. An arithmetic average of the values measured in this manner was designated as the average inter-brightening material distance.

As FIG. 4 illustrates, the samples whose average overlapping quantity (y) was 0.9 flakes or more had a good outer appearance (luster), and the samples whose average overlapping quantity (y) was 0.3969x+0.594 or less had a passing (good) millimeter wave permeability.

Based on the above results, the present examples (9 types) had both good luster and electromagnetic wave permeability. Meanwhile, the comparative examples (9 types) all had good luster, but poor electromagnetic wave permeability.

Table 2 shows the average overlapping quantity (y), average inter-brightening material distance (x), luster, and electromagnetic wave (millimeter wave) permeability (millimeter wave transmission attenuation amount) on a polycarbonate substrate for Examples 10, 11, 12, 13, and 14. Example 10 uses a coating composition whose ground aluminum content in the coating film component is 5 mass % and whose glass flake content in the coating film component is 8 mass %. Example 11 uses a coating composition whose ground aluminum content in the coating film component is 5 mass % and whose pearl mica content in the coating film component is 8 mass %. Example 12 uses a coating composition in which deposited aluminum serves as the brightening material, and the deposited aluminum content in the coating film component is 0.8 mass %. Example 13 uses a coating composition whose deposited aluminum content in the coating film component is 0.8 mass % and whose glass flake content in the coating film component is 8 mass %. Example 14 uses a coating composition whose deposited aluminum content in the coating film component is 0.8 mass % and whose pearl mica content in the coating film component is 8 mass %. Also, a graph of the relationship between the average inter-brightening material distance and the average overlapping quantity is shown in FIG. 4. In addition, the values for Examples 2, 3, 10, and 12, and Comparative Examples 5, 6, and 7, which all exhibited borderline pass/fail millimeter wave permeability, were used to calculate an approximated curve of the average inter-brightening material distance and average overlapping quantity (y=0.3969x+0.594). This curve is also shown in FIG. 4. Note that the measurement method is identical to the method described above.

TABLE 2

| Sample | Brightening material content (mass %) | | Non-Conductive pigment content (mass %) | | Thickness (μm) | Brightening material content x Thickness | Number of Coatings (times) | Luster IV | Millimeter wave permeability | | Average overlapping quantity (y: Flakes) | Average inter-brightening material distance (x: μm) |
|---|---|---|---|---|---|---|---|---|---|---|---|---|
| | ground aluminum | deposited aluminum | glass flake | pearl mica | | | | | Attenuation Amount (dB) | Evaluation | | |
| Comparative Example 6 | 5 | 0 | 0 | 0 | 20 | 100 | 1 | 168.3 | 1.064 | fail | 2.1 | 2.8 |

TABLE 2-continued

| Sample | Brightening material content (mass %) ground aluminum | Brightening material content (mass %) deposited aluminum | Non-Conductive pigment content (mass %) glass flake | Non-Conductive pigment content (mass %) pearl mica | Thickness (μm) | Brightening material content x Thickness | Number of Coatings (times) | Luster IV | Millimeter wave permeability Attenuation Amount (dB) | Millimeter wave permeability Evaluation | Average overlapping quantity (y: Flakes) | Average inter-brightening material distance (x: μm) |
|---|---|---|---|---|---|---|---|---|---|---|---|---|
| Example 10 | 5 | 0 | 8 | 0 | 20 | 100 | 1 | 183.7 | 0.9764 | pass | 2.1 | 4.4 |
| Example 11 | 5 | 0 | 0 | 8 | 20 | 100 | 1 | 203.5 | 0.8216 | pass | 2.0 | 4.8 |
| Example 5 | 5 | 0 | 0 | 0 | 20 | 100 | 2 | 172.5 | 0.874 | pass | 2.0 | 5.6 |
| Example 12 | 0 | 0.8 | 0 | 0 | 20 | 16 | 2 | 163.5 | 0.8643 | pass | 2.5 | 5.3 |
| Example 13 | 0 | 0.8 | 8 | 0 | 20 | 16 | 1 | 179.4 | 0.7147 | pass | 2.4 | 5.8 |
| Example 14 | 0 | 0.8 | 0 | 8 | 20 | 16 | 1 | 205.1 | 0.7812 | pass | 2.5 | 5.8 |

Elements of the present examples are listed below.
Polycarbonate substrate: plate-shaped (thickness: 5 mm).
Coating composition: acrylic urethane paint.
Ground aluminum: planar-shaped (flakes, thickness: 1 μm, average particle size: 15 μm).
Deposited aluminum: planar-shaped (flakes, thickness: 0.2 μm, however, resin covers the outer side of 0.03-μm thick deposited aluminum, average particle size: 12 μm).
Glass flake (thickness: 1 μm, average particle size: 40 μm).
Pearl mica (thickness: 0.7 μm, average particle size: 18 μm).
Coating method: samples were spray coated, and then baked after each coating. For samples subjected to two coatings, the thickness formed by coating and baking once was set to 10 μm and the coating/baking process was repeated twice.

Based on the above results, due to the use of deposited aluminum as the brightening material, Example 12 was able to secure luster even with less content (one-fifth or less than the content of ground aluminum) compared to Example 5.

Examples 10 and 11 had better luster than Comparative Example 6, and Examples 13 and 14 had better luster than Example 12 due to the use of coating compositions that included glass flakes or pearl mica.

Because Examples 10 and 11 use coating compositions that included glass flakes or pearl mica, Examples 10 and 11 had a larger average inter-brightening material distance than Comparative Example 6, which resulted in a smaller millimeter wave transmission attenuation amount and better electromagnetic wave (millimeter wave) permeability.

Due to the use of coating compositions that include glass flakes or pearl mica, Examples 10, 11, 13, and 14 were able to secure electromagnetic wave (millimeter wave) permeability even with a 20 μm thick coating film, with the millimeter wave transmission attenuation amount at 1 dB or less even though multiple coatings (additional coatings) were not performed as with Examples 5 and 12.

The present invention is not limited to the above examples, and may be practiced using suitable variations that do not depart from the spirit and scope of the present invention.

Reference Signs List

| 10 | ELECTROMAGNETIC WAVE-PERMEABLE BRILLIANT COATED RESIN PRODUCT |
| 20 | BRILLIANT COATING FILM |
| 21 | BRIGHTENING MATERIAL |
| 22 | SURFACE |
| 30 | RESIN SUBSTRATE |

The invention claimed is:

1. An electromagnetic millimeter wave-permeable brilliant coated resin product comprising:
   a brilliant coating film having electromagnetic wave permeability and a thickness of 23 μm to 40 μm and comprising a coating composition provided on a resin substrate directly or on another coating film provided on the substrate, the coating composition comprising a planar brightening material formed from aluminum and 1 to 20 mass % of a planar non-conductive selected from the group consisting of a glass flake and a pearl mica,
   wherein:
   within the brilliant coating film, the brightening material is oriented in a state such that a plane thereof is biased toward a direction that follows a surface of the brilliant coating film,
   an average overlapping quantity (y), which is an average of a quantity of brightening material that crosses one orthogonal line that is orthogonal to the surface of the brilliant coating film that satisfies the following two formulae:

$$y \geq 0.5 \quad \text{(formula 1), and}$$

$$y \leq 0.3969x + 0.594 \quad \text{(formula 2),}$$

where, the unit for x is μm, and
   the average inter-brightening material distance (x), which is an average of distances on the orthogonal line between adjacent brightening materials that cross said orthogonal line, that satisfies the following formula:

$$x \geq 3 \quad \text{(formula 3),}$$

wherein the electromagnetic millimeter wave-permeable brilliant coated resin product has an intensity value (IV) of 142.5 to 205.1 that is achieved by satisfying formula 1 above, and
   wherein the electromagnetic millimeter wave-permeable brilliant coated resin product has electromagnetic millimeter wave permeability that is achieved by satisfying formula 2 above.

2. The electromagnetic millimeter wave-permeable brilliant coated resin product according to claim 1, wherein the brightening material is ground aluminum that is formed by grinding an aluminum foil.

3. The electromagnetic millimeter wave-permeable brilliant coated resin product according to claim 2, wherein a content of the brightening material within the brilliant coating film is 2.5 to 10.0 mass %.

4. The electromagnetic millimeter wave-permeable brilliant coated resin product according to claim 1, wherein the brightening material is deposited aluminum that is formed by grinding an aluminum film formed by deposition.

5. The electromagnetic millimeter wave-permeable brilliant coated resin product according to claim 4, wherein a content of the brightening material within the brilliant coating film is 0.5 to 2.0 mass %.

6. The electromagnetic wave-permeable brilliant coated resin product according to claim 1, wherein a product of a value indicating the mass % content of brightening material within the brilliant coating film and a value indicating a thickness of the brilliant coating film in units of μm is 100 or less.

7. The electromagnetic millimeter wave-permeable brilliant coated resin product according to claim 1, wherein a millimeter wave transmission attenuation amount of the coating film when the resin product is subjected to 76.575 GHz millimeter waves at an incident angle of 0 degrees at room temperature is 1 dB or less.

8. The electromagnetic millimeter wave-permeable brilliant coated resin product according to claim 1, wherein the average overlapping quantity (y) satisfies the formula:

$y \geq 0.9$.

9. The electromagnetic millimeter wave-permeable brilliant coated resin product according to claim 1, wherein the resin substrate is a member selected from the group consisting of polycarbonate (PC), acrylonitrile-ethylene-styrene (AES) copolymer and polypropylene (PP).

10. An electromagnetic millimeter wave-permeable brilliant coated resin product comprising:
a brilliant coating film permeable to electromagnetic millimeter waves and having a thickness of 23 μm to 40 μm, the brilliant coating film including:
a coating composition provided on a resin substrate directly or on another coating film provided on the substrate, the coating composition comprising a planar aluminum brightening material in an amount of 2.5 to 10 mass % and the brightening material being oriented in a plane within the brilliant coating film that is biased toward a direction following a surface of the brilliant coating film,
an average overlapping quantity (y), which is an average of a quantity of brightening material that crosses one orthogonal line that is orthogonal to the surface of the brilliant coating film, satisfying the following two formulae:

$y \geq 0.5$ (formula 1), and $y \leq 0.3969x + 0.594$ (formula 2), where, the unit for x is μm, and
the average inter-brightening material distance (x), which is an average of distances on the orthogonal line between adjacent brightening materials that cross said orthogonal line, satisfying the following formula:

$x \geq 3$ (formula 3).

wherein the electromagnetic millimeter wave-permeable brilliant coated resin product has an intensity value (IV) of 142.5 to 205.1.

11. The electromagnetic millimeter wave-permeable brilliant coated resin product according to claim 10, wherein the coating composition further comprises 1 to 20 mass % of a planar non-conductive pigment that increases the inter-brightening material distance (x), the planar non-conductive pigment is selected from the group consisting of a glass flake and a pearl mica.

12. The electromagnetic millimeter wave-permeable brilliant coated resin product according to claim 10, wherein a millimeter wave transmission attenuation amount of the coating film when the resin product is subjected to 76.575 GHz millimeter waves at an incident angle of 0 degrees at room temperature is 1 dB or less.

13. The electromagnetic millimeter wave-permeable brilliant coated resin product according to claim 10, herein the average overlapping quantity (y) satisfies the formula:

$y \geq 0.9$

* * * * *